No. 609,884. Patented Aug. 30, 1898.
E. GRABER & L. HEPWORTH.
RULING MACHINE.
(Application filed Apr. 9, 1898.)
(No Model.) 12 Sheets—Sheet 2.

WITNESSES. INVENTORS.

No. 609,884. Patented Aug. 30, 1898.
E. GRABER & L. HEPWORTH.
RULING MACHINE.
(Application filed Apr. 9, 1898.)

(No Model.) 12 Sheets—Sheet 3.

WITNESSES. INVENTORS.

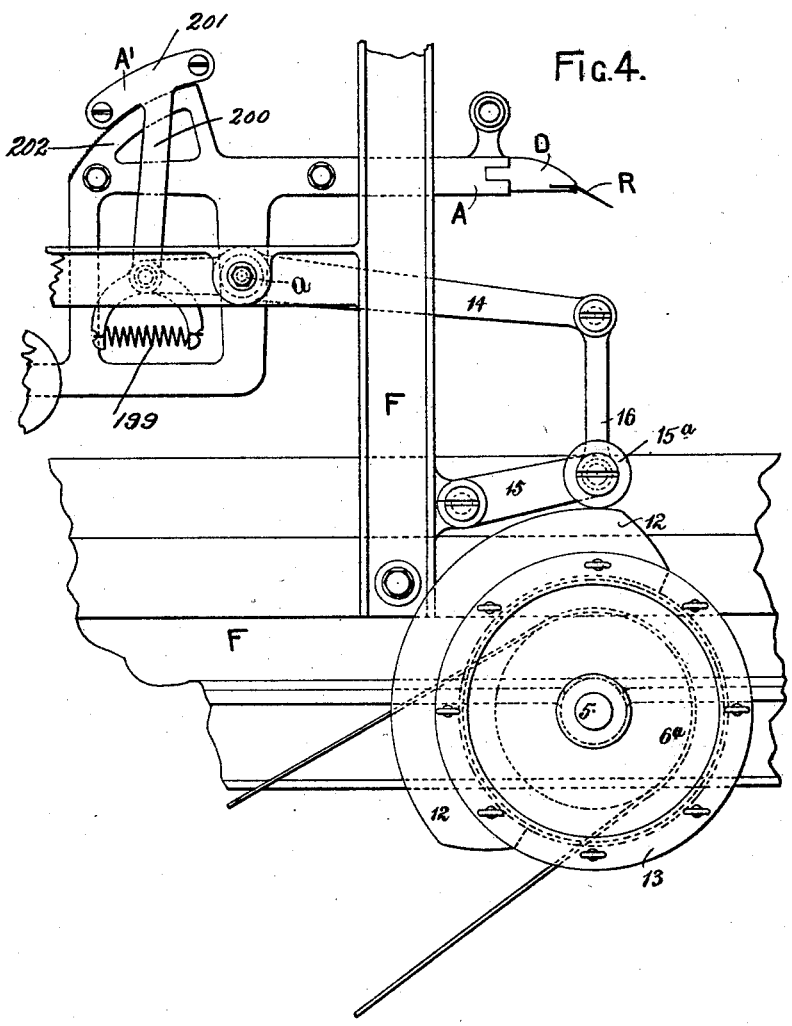

No. 609,884. Patented Aug. 30, 1898.
E. GRABER & L. HEPWORTH.
RULING MACHINE.
(Application filed Apr. 9, 1898.)
(No Model.) 12 Sheets—Sheet 5.
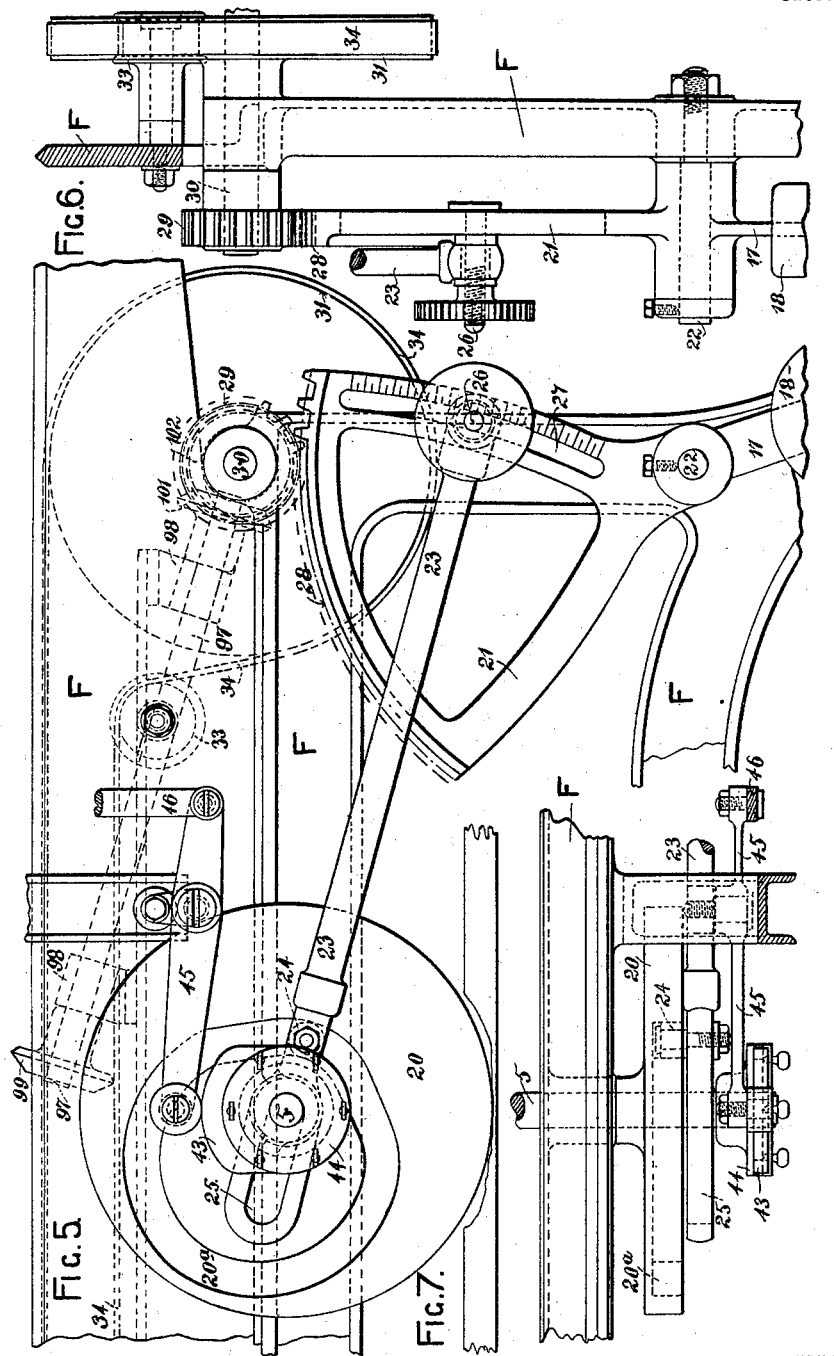
WITNESSES.
A. Millward Flack.
Alfred N. Broad.
INVENTORS.
Ellis Graber and Lewis Hepworth.
per. Robert F. Phillips
Attorney.
THE NORRIS PETERS CO., PHOTO-LITHO., WASHINGTON, D. C.

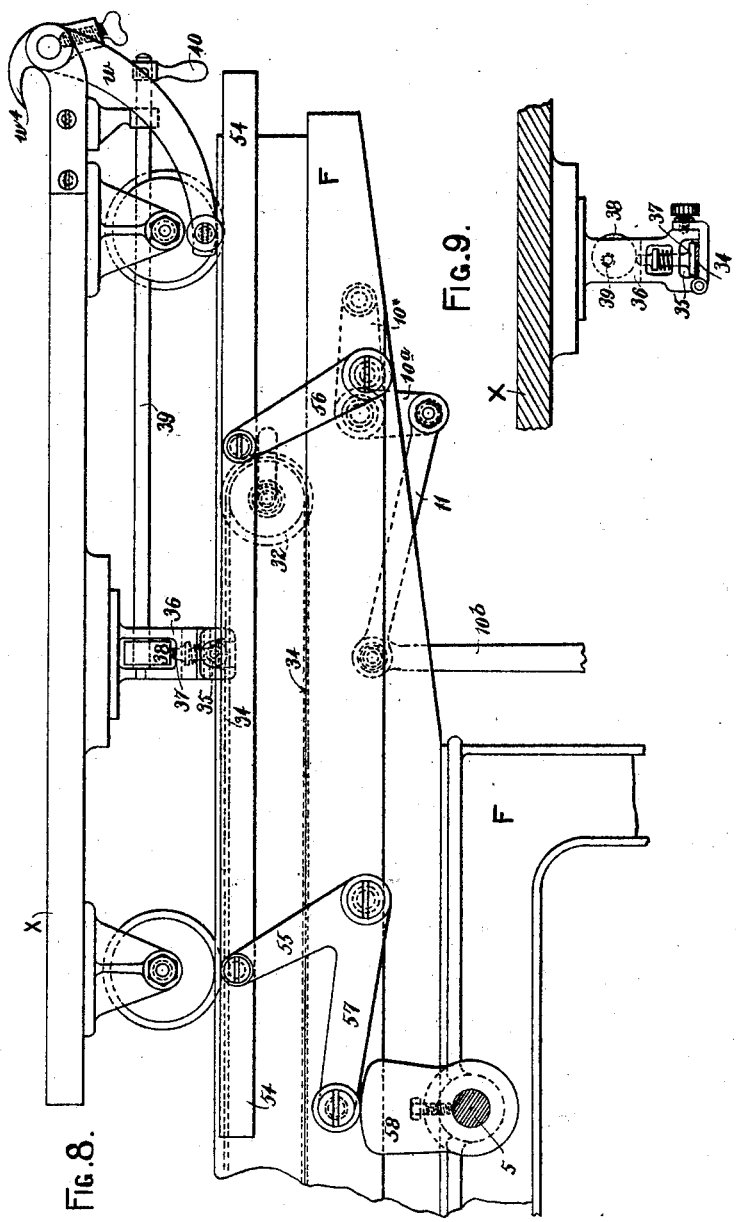

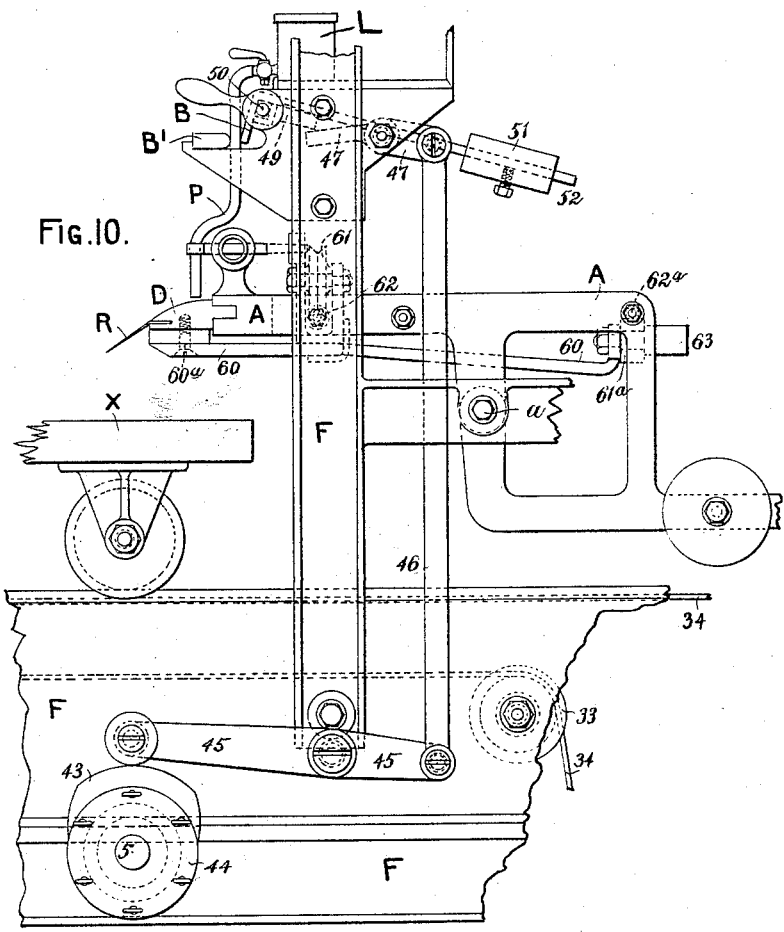
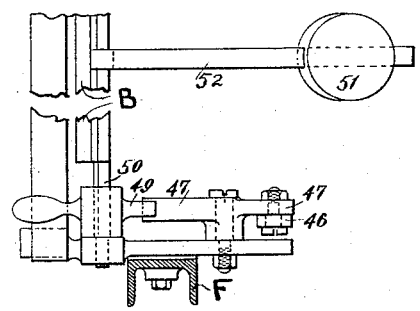

No. 609,884. Patented Aug. 30, 1898.
E. GRABER & L. HEPWORTH.
RULING MACHINE.
(Application filed Apr. 9, 1898.)
(No Model.)  12 Sheets—Sheet 8.
Fig. 12.  Fig. 13.
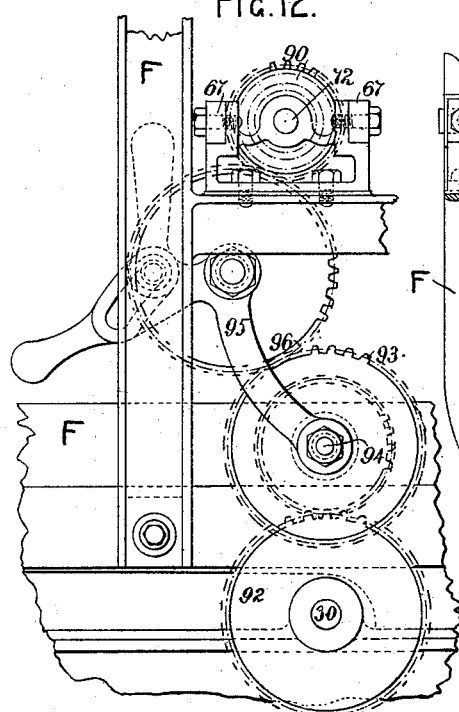
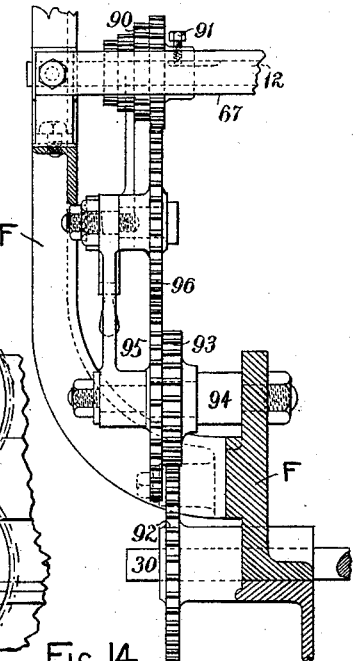
Fig. 14.
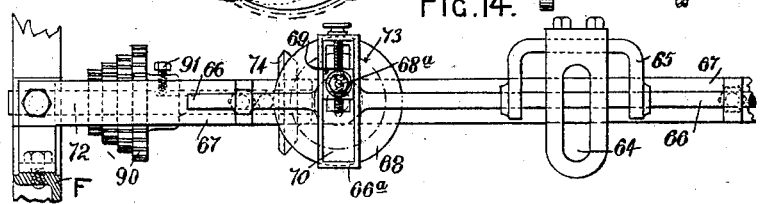
Fig. 15.
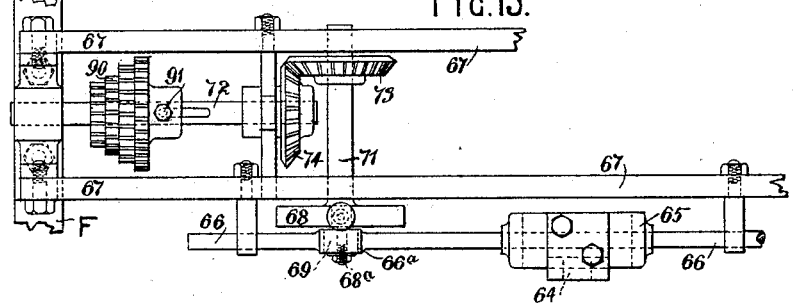
WITNESSES.  INVENTORS.
A. Millward Flack  Ellis Graber and Lewis Hepworth
Alfred W. Broad  per Robert E. Phillips
  Attorney.
THE NORRIS PETERS CO., PHOTO-LITHO., WASHINGTON, D. C.

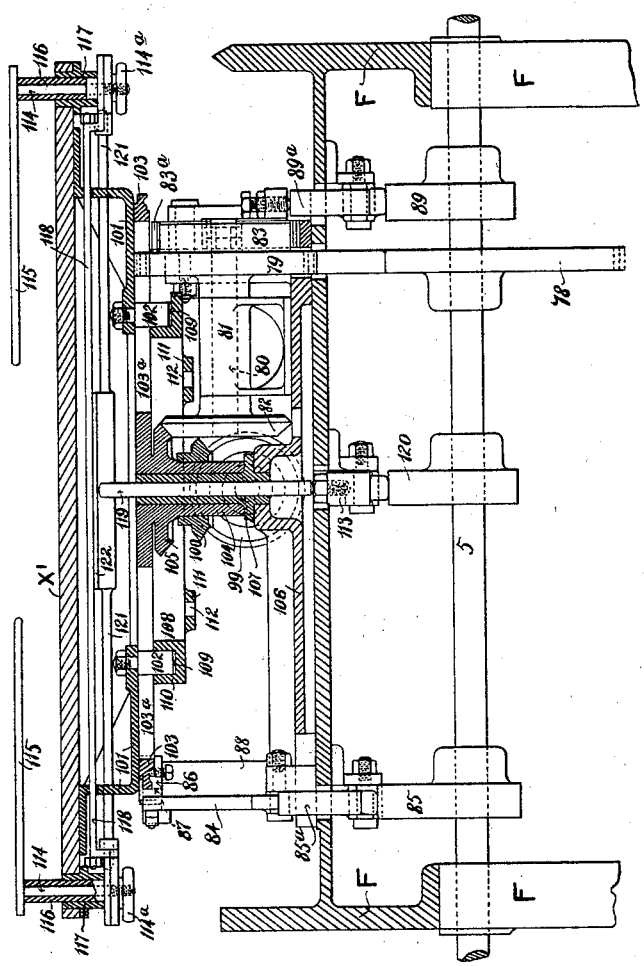

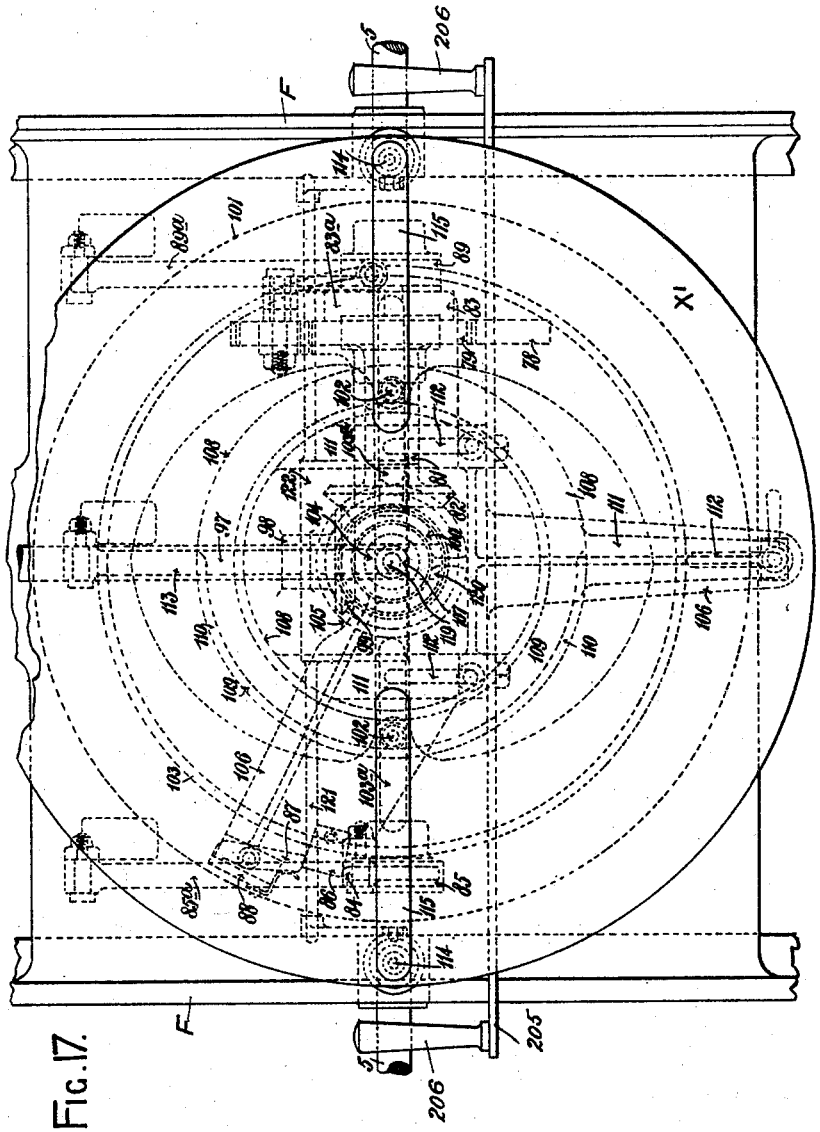

No. 609,884. Patented Aug. 30, 1898.
E. GRABER & L. HEPWORTH.
RULING MACHINE.
(Application filed Apr. 9, 1898.)
(No Model.) 12 Sheets—Sheet 11.
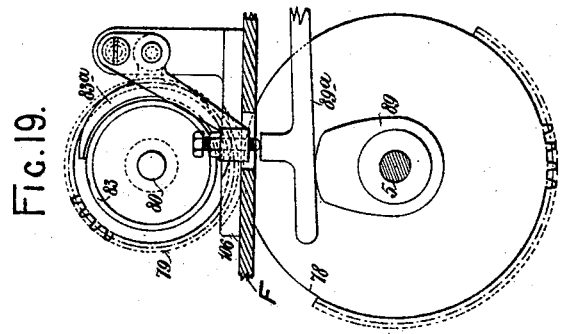
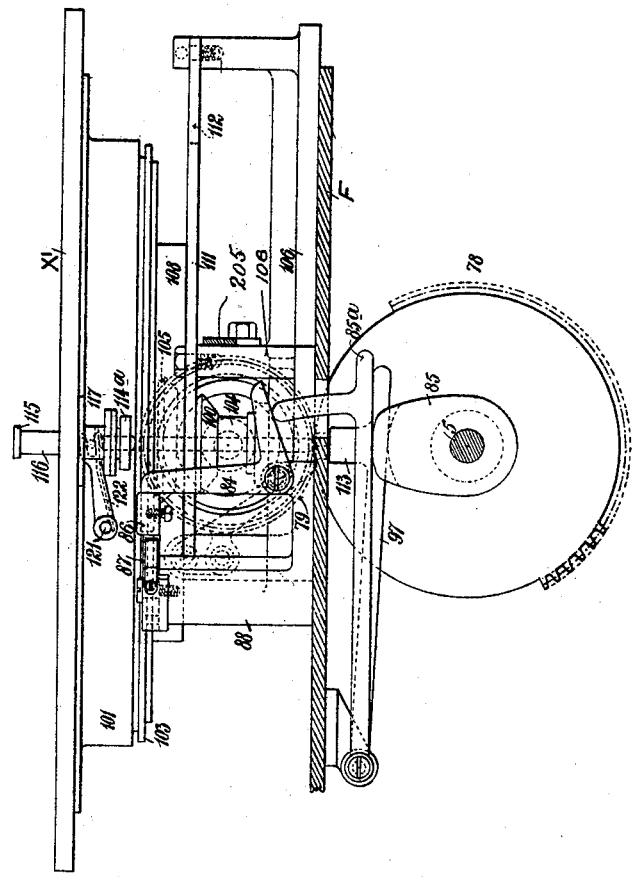
WITNESSES: INVENTORS.
Ellis Graber & Lewis Hepworth.

No. 609,884. Patented Aug. 30, 1898.
E. GRABER & L. HEPWORTH.
RULING MACHINE.
(Application filed Apr. 9, 1898.)
(No Model.) 12 Sheets—Sheet 12.
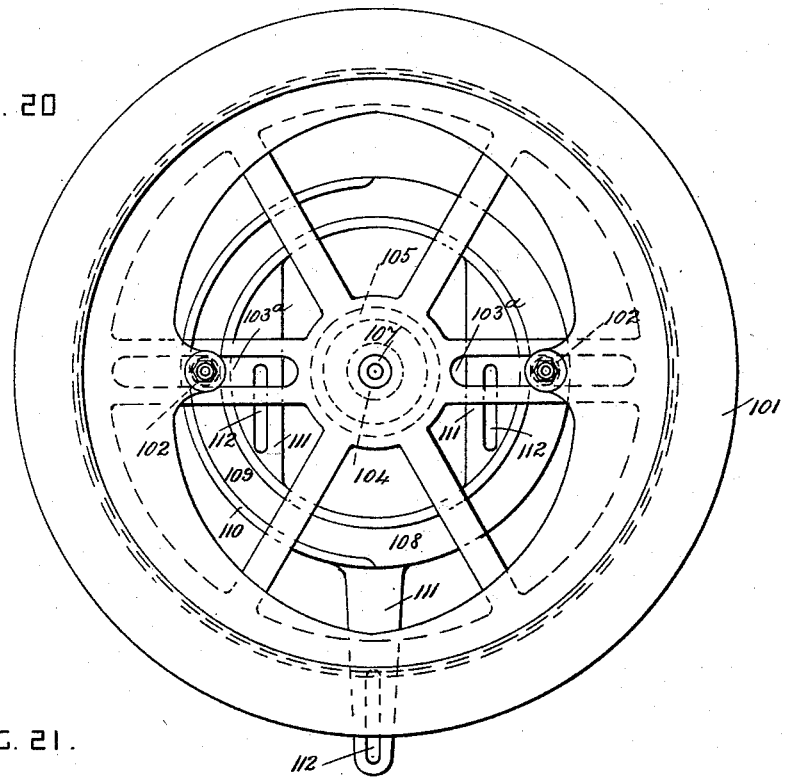
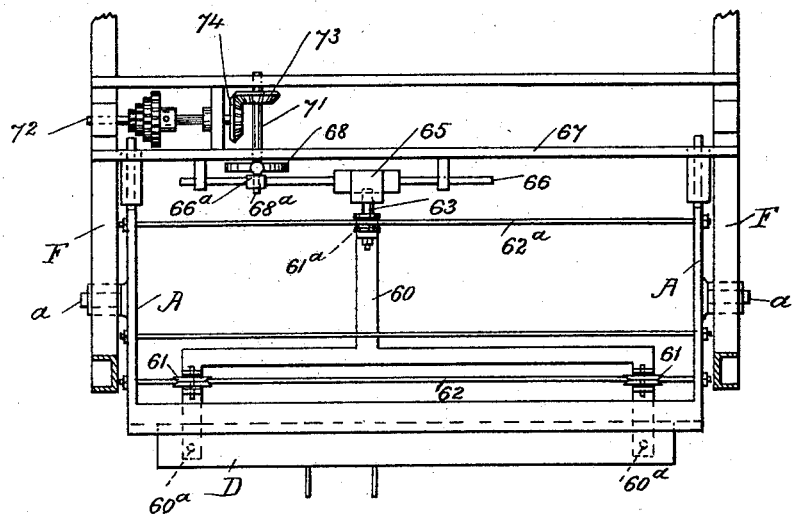
WITNESSES
INVENTORS

UNITED STATES PATENT OFFICE.

ELLIS GRABER AND LEWIS HEPWORTH, OF TUNBRIDGE WELLS, ENGLAND.

RULING-MACHINE.

SPECIFICATION forming part of Letters Patent No. 609,884, dated August 30, 1898.

Application filed April 9, 1898. Serial No. 677,018. (No model.)

*To all whom it may concern:*

Be it known that we, ELLIS GRABER and LEWIS HEPWORTH, subjects of the Queen of Great Britain, residing at Tunbridge Wells, in the county of Kent, England, have invented certain new and useful Improvements in Ruling-Machines, of which the following is a full and complete specification.

This invention relates to improvements in ruling-machines in which oscillating pens act in conjunction with reciprocating or revoluble tables such as are specified in our prior patent, No. 589,827, bearing date September 14, 1897.

This invention consists in the novel construction and combination of the parts hereinafter fully described and claimed.

We attain these objects by the mechanism illustrated in the accompanying drawings, in which—

Figure 1:
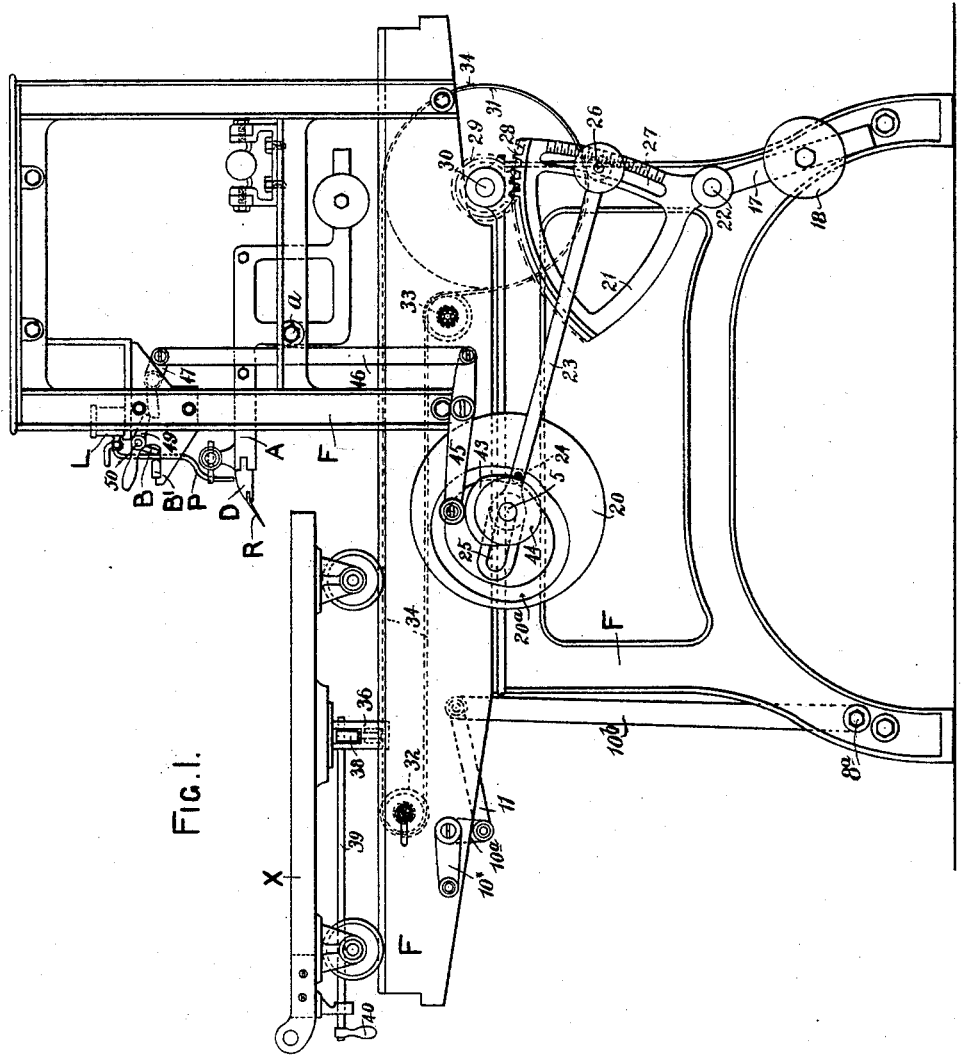
Figure 2:
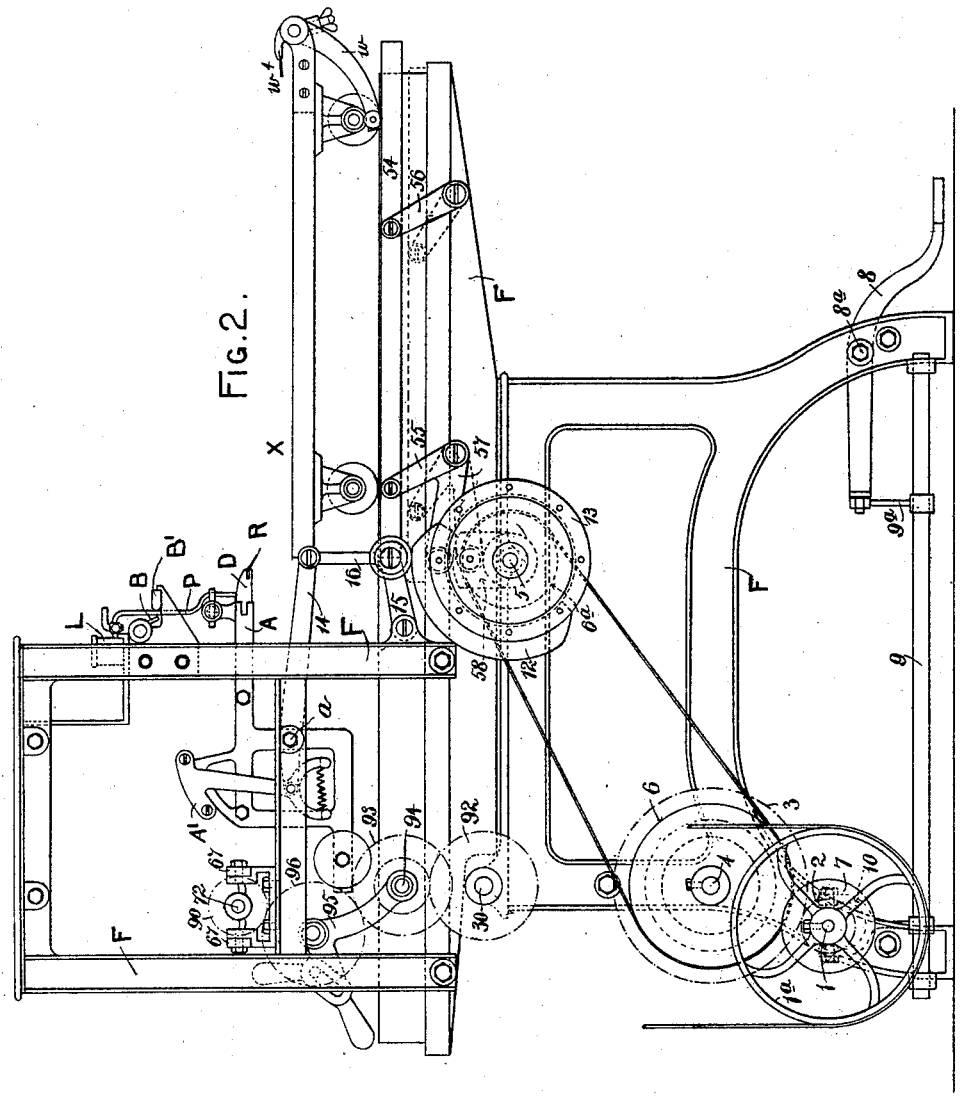
Figure 3:
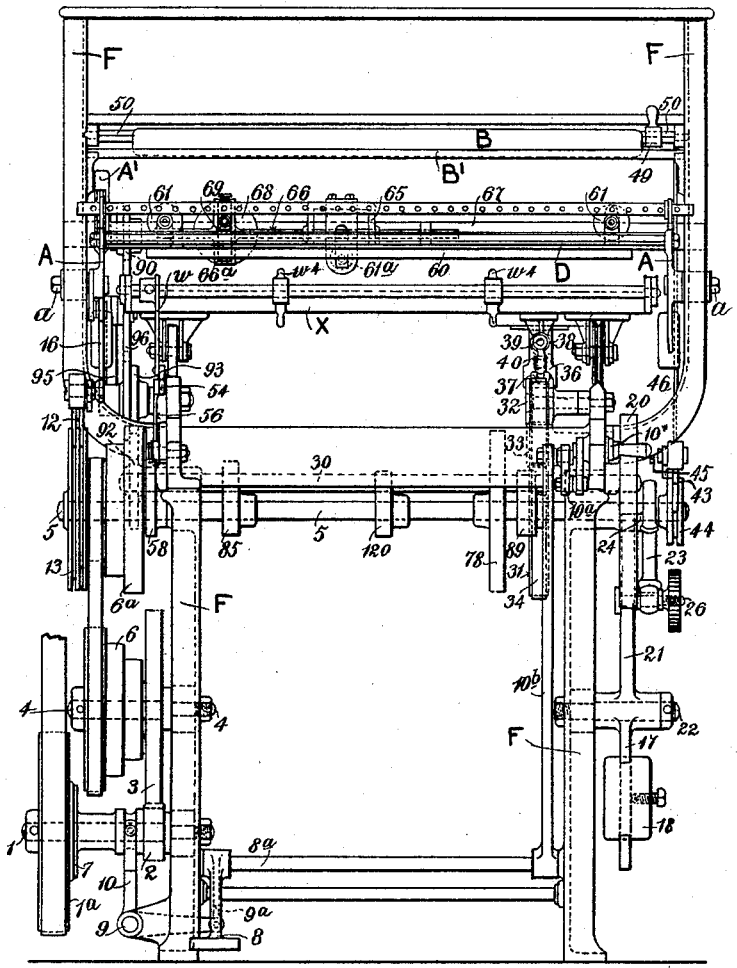

Figure 1, Sheet No. 1, and Fig. 2, Sheet No. 2, are views in side elevation of a machine embodying the present invention, the former showing the mechanism on one side of the machine and the latter showing that on the other side thereof. Fig. 3, Sheet No. 3, is a view in front elevation of the machine. In the foregoing views many of the details illustrated in other figures are omitted for the sake of clearness. Fig. 4, Sheet No. 4, is a broken view, in side elevation, showing the mechanism for controlling the rise and fall of the pen-beam. Figs. 5, 6, and 7, Sheet No. 5, are broken views, in side elevation, end elevation, and plan, respectively, showing the gear for imparting motion to the reciprocating table. Fig. 8, Sheet No. 6, is a broken view, in side elevation, showing the mechanism for operating the grippers and stencil-holder, when such is used, the mechanism for connecting the reciprocating table to its driving mechanism, so that its travel may commence at any given point, and the mechanism for holding the driving-clutch in gear. Fig. 9, Sheet No. 6, is a view in transverse section of the clamping device of the mechanism for connecting the reciprocating table to the driving mechanism. Figs. 10 and 11, Sheet No. 7, are broken views, in side elevation and plan, respectively, showing the mechanism for operating the nipping-bar of the ink-controlling device. Fig. 12, Sheet No. 8, is a broken view, in side elevation, showing the mechanism for giving an oscillating motion to the pen-slide. Figs. 13 and 14, Sheet No. 8, are broken views, in front elevation, thereof; and Fig. 15, Sheet No. 8, is a broken view in plan thereof. Fig. 16, Sheet No. 9, is a view in front elevation, partly in section, of the revoluble table. Fig. 17, Sheet No. 10, is a broken view in plan thereof. Fig. 18, Sheet No. 11, is a view in side elevation, partly in section, of the revoluble table; and Fig. 19, Sheet No. 11, is a side view showing the brake therefor. Fig. 20 is a plan view of the underframe 101 of the revoluble table and the means for placing it eccentric of its driving-shaft. Fig. 21 is a plan view of the pen-beam and the means for reciprocating the pen-slide laterally.

According to the present invention motion is imparted to the reciprocating and revoluble tables X and X', respectively, by means of power-gear in the following manner: Fixed to the frame F of the machine is a stud-axle 1, on which is mounted a pulley $1^a$, which receives motion by a belt from any convenient source of power. On the stud-axle 1 is loosely mounted a spur-pinion 2, which gears with a spur-wheel 3 on a second stud-axle 4, from which motion is communicated to an axle 5 by means of a belt and a pair of coned pulleys 6 and $6^a$, thus providing for the variation of the speed at which the axle 5 is driven. The spur-pinion 2 on the axle 1 is coupled to the pulley $1^a$, when it is desired to set the machine in motion, by means of a sliding clutch 7, brought into action from the front end of the machine by means of a treadle-lever 8, carried by a rocking shaft $8^a$, mounted in suitable bearings in the frame F. The rear end of the treadle-lever 8 is connected with a second rocking shaft 9 by means of a link $9^a$, and the said rocking shaft is connected with the clutch 7 by means of the usual forked lever 10. The clutch 7 is controlled by any suitable spring (not shown) to keep it out of engagement with the pulley $1^a$ when the foot is removed from the treadle 8. To enable the machine to be run without the operator continually keeping his foot on the treadle 8, the rocking shaft $8^a$ is capable of being operated to keep the clutch 7 in engagement with the pulley $1^a$ by means of a bell-crank lever $10^*$ $10^a$, pivoted to the frame F and connected with a lever 10$^b$ on the rocking shaft 8$^a$ by a link 11, as shown by Figs. 1 and 8.

In Fig. 3 the slidable member of the clutch is shown formed integral with the pinion 2, and the pinion and clutch member are slid together on the pin by means of the forked clutch-lever 10, which engages with a circumferential groove in the sleeve which connects the said pinion and clutch member. The slidable clutch member is slid into engagement with the stationary clutch member on the driving-pulley by pressing downward on the lever 8 with the foot or by pressing downward on the part 10* of the bell-crank lever with the hand.

The pen-beam A, which is pivoted to the frame F at $a$, is lifted—i. e., rocked on its pivot—by means of one or more cams 12, carried by a disk 13 on the main axle 5. This cam acts on the pen-beam A through the medium of the striker 14 and the clutch mechanism A', as set forth in our prior patent, No. 589,827, by means of a lever 15, pivoted to the frame of the machine and connected with the striker 14 by a link 16, the end of the lever 15 carrying a roller 15$^a$, engaging the cam 12. The axle 5 is speeded to make one complete revolution for each reciprocation or oscillation of the table, as the case may be. The fall, as well as the lift, of the pen-beam is controlled by the cam 12 by so shaping the cam as to keep the pen-beam lifted during the required period.

The clutch mechanism A' (shown in Fig. 4) is connected to the striker 14, which is pivoted on one of the pivots $a$, which support the pen-beam. An arm 200 is pivoted to the striker 14 and is normally supported in a vertical position by a spring 199. The arm 200 carries a curved block 201, which bears on a quadrant 202, secured to the pen-beam. When the roller 15$^a$ is raised, the block 201 depresses the pen-beam by frictional contact with the quadrant 202; but the pen-beam can be raised independent of the striker, the spring 199 operating to hold the block 201 in position.

Motion is imparted to the reciprocating table X from the main axle 5 in the following manner: On the axle 5, on the opposite side of the machine to the cam-disk 13 and coned pulley 6$^a$, is a face-cam 20, adapted to impart motion to a rocking quadrant 21, pivoted at 22 to the frame F of the machine by means of a link 23, the cam being such that it gives a quicker movement to the quadrant in one direction than the other and a slight pause at each end of the stroke before its motion is reversed. The link 23 carries a roller 24, with which engages the groove 20$^a$ of the cam 20, and it is guided at its forward end by a slot 25 in it engaging with the axle 5. The other end of the link 23 is connected to the quadrant 21 by means of a stud-pin 26, the position of which is adjustable in a slot 27 in the quadrant, so that the point of connection of the link may be varied to give the reciprocating table X any desired length of travel. The rocking quadrant preferably has an extension-arm 17, carrying a weight 18 to balance it. The face of the quadrant 21 carries a rack 28, which gears with a pinion 29. The pinion is operatively connected to a shaft or axle 30 by any approved means, such as a key or clutch, and it can be removed from the shaft or disconnected from the shaft when necessary. On the axle 30 is fixed a drum 31, around which and around an idle pulley or drum 32 at the front end of the machine and over a suitable guide pulley or drum 33, mounted near the periphery of the drum 31, is a band 34, of any suitable type, but preferably of the positive driving type. The band 34 passes through a slot 35 in a bracket 36, fixed to the under side of the reciprocating table X, and is adapted to be clamped therein to lock the table to it in any desired position by means of a gripping-piece 37, guided in the bracket 36 and acted upon by an eccentric 38. This eccentric is mounted on a shaft 39, which extends to the front end of the machine, where it carries a lever 40 or its equivalent, whereby it can be rotated to actuate the eccentric gripping device.

The ink is supplied to the pens R from reservoirs L through flexible tubes P, arranged as set forth in our prior patent, No. 589,827. The nipping-bar B, which, in conjunction with the fixed bar B', acts to throttle the flexible tubes P, is operated by a cam 43, adjustably mounted on a disk 44, fixed on the axle 5, through a pair of levers 45 and 47, both pivoted to the frame F of the machine and connected by a link 46, the free end of the lever 47 engaging with an arm 49, carried by the rocking shaft 50, on which the nipping-bar is mounted, the said arm being capable of sliding laterally on the said shaft, so that it can be moved out of engagement with the lever 47 when it is desired to entirely stop the flow of ink. The necessary pressure on the nipping-bar B is obtained by means of a weight 51, adjustably mounted on an arm 52, carried by the rocking shaft 50.

The mechanism for operating the table and the mechanism for operating the nipping-bar are connected so that the nipping-bar prevents the ink from flowing while the table is being moved back and the pens are not at work and so that the ink is permitted to flow during as much of the forward movement of the table as is desirable in order that the pens may be supplied with ink while at work.

The sheets of paper to be ruled are held to the reciprocating table X by means of grippers $w^4$, as specified in our prior patent, No. 589,827, the arm or lever $w$ operating the said grippers, and the stencil-holder, when such is used, is operated by means of a rising-and-falling bar 54, carried by two arms or levers 55 and 56, pivoted to the side of the frame of the machine. The arm or lever 55 carries a second arm 57, forming a bell-crank lever.

The free end of this arm 57 carries a roller which engages with a cam 58 on the main shaft 5, which is timed to operate the arm or lever $w$ during the pause of the table at the forward end of its travel. By this construction the movement necessary to operate the grippers is imparted to the arm or lever $w$ at whatever point the table stops without any further adjustment.

The revoluble table consists, essentially, of two parts, a platen or table X', mounted on an underframe 101, which carries two studs 102 at points diametrically opposite to one another, and a wheel-shaped frame 103, having two slots $103^a$. The frame 103 carries a sleeve or hollow axle 104, adapted to fit over a hollow stud-axle 107, carried by a foundation-frame 106. This foundation-frame carries also a ring-shaped frame 108, having a groove 109, the outer wall 110 of which is cut away for about half its circumference. This ring-shaped frame 108 has three bars 111, each having a slot 112, and it is attached to vertical pillars of foundation-frame 106 by means of suitable screws or bolts passing through the said slots 112, which provide for the ring-shaped frame 108 being placed eccentric with the hollow stud-axle 107 when it is desired to give to the revoluble table the necessary movement to rule oval ellipses or polysided figures.

If the ring-shaped frame 108 is placed concentric with the stud-axle 107, as shown in Figs. 16, 17, and 18, the revoluble table will simply rotate about the center of the stud-axle 107, thus allowing for the ruling of circles or segments thereof; but if the ring-shaped frame 108 is moved so as to be placed eccentric with the stud-axle 107 the revoluble table will receive an elliptical movement through the aggregate motion derived from the groove-ring 108, the slots $103^a$ in the frame 103, and the studs 102, carried by the frame 101.

In order to remove the frame 106, which supports the revoluble table, from the main frame F when the revoluble table is not required to be used, a bar 205 is secured to the frame 106 crosswise of the machine, as shown in Figs. 17 and 18, and this bar is provided with handles 206, which project beyond the sides of the frame F.

The sheets of paper may be held down on the revoluble table by hand, but are preferably secured by means of clamps 115, which may also serve to hold the stencil for the purpose of masking the paper where a line is not to be ruled. The clamps 115 are carried by studs 114, fixed in tubular sleeves 116 by means of lock-nuts $114^a$, so that they may be turned in any direction. The sleeves 116 slide in suitable bearings 117 in the table and are connected by a flat bar 118 on the under side of the table. This bar 118 is operated to lift the clamps by a rod 119, mounted in and passing through the center of the stud-axle 107. The lower end of the rod 119 engages with the end of a lever 113, pivoted to the frame of the machine and engaging with the periphery of a cam 120, mounted on the axle 5, so that the rod 119, and with it the bar 118, carrying the clamps, is periodically raised, thus allowing the sheets of paper on the table to be removed therefrom after being ruled.

The clamps 115 are kept in contact with the sheets of paper on the table by means of a spring-controlled axle 121, engaging the bar 118 through a plate-arm 122.

Motion is imparted to the revoluble table X' from the axle 5 in the following manner: On the said axle is a spur-wheel 78, which gears with a similar wheel 79, carried by an axle 80, mounted in a suitable bearing 81 on the underframe 106 of the revoluble table. On the axle 80 is a bevel-wheel 82, which gears with a bevel-wheel 105 on the sleeve or hollow axle 104 of the frame 103 of the revoluble table. A certain number of the teeth of the spur-wheel 78 on the main shaft 5 are cut off or omitted for the purpose of giving the table a pause at the end of each revolution, and the number of the remaining teeth is such that one revolution of the axle 5 causes the revoluble table to travel slightly more than a complete revolution, so as to insure making a perfect joint of the lines of circles and other figures. During the pause the table is caused to rotate backward just the amount it has traveled over the complete revolution by means of a bell-crank lever 84, pivoted to the frame 106, one arm of which is actuated by a cam 85 on the axle 5 through a lever $85^a$, pivoted to the frame of the machine, and the other engages with a projecting piece 86 on the frame 103 of the rotating table. To stop the table at the desired point in its backward rotation, a spring-controlled pawl 87, pivoted to a bracket 88, engages with the projecting piece 86, the arrangement being such that the pawl 87 allows the projecting piece 86 on the frame 103 to pass by it when the table is rotating in a forward direction.

To check the momentum of the revoluble table X' just before it reaches the end of its rotation, a brake, preferably of the shoe-and-drum type, is employed on the intermediate axle 80, the brake-shoe $83^a$ or its equivalent being operated to bring it into contact with the drum 83 on the axle 80 by a cam 89 on the axle 5 acting through a lever $89^a$, pivoted to the frame of the machine.

Each of the two forms of table hereinbefore described can be used in combination with the means described for raising and lowering the pen-beam at the proper times and also with the means described for permitting the ink to flow through the feed-tube from the reservoir at the proper times.

To enable wavy or sinuous lines and polysided or figures of a shape other than round or oval to be ruled, the gripping attachment of the pen-beam A is slackened to allow the pen-slide D to slide or move transversely therein, motion being imparted to the said slide in the following manner: Beneath the pen-beam A is a light frame 60, the forward ends of which are fixed to the under side of the pen-slide by means of bolts or screws 60ª. This frame is adapted to slide transversely by means of suitable rollers 61 61ª on transverse bars 62 and 62ª, carried by the pen-beam A. The rear end of this frame carries a stud 63, which engages with a vertical slot 64 in a frame 65, forming part of the reciprocating mechanism, the arrangement being such that the pen-beam A is free to rock on its pivot at the same time that a reciprocating movement is being given to the pen-slide. The frame 65 is carried by a bar 66, sliding in bearings carried by a transverse frame 67, fixed to the frame of the machine. Motion is imparted to the sliding bar 66 by means of a crank-disk 68, the pin 68ª of which carries a block 69, which slides in a transverse slot 70, formed in an enlargement 66ª of the sliding bar 66. The crank-disk 68 is mounted on an axle 71, which is geared to another axle 72 at right angles to it by means of a pair of bevel-wheels 73 and 74. The axle 72 receives its motion from the axle 30 through a train of spur-gearing so arranged that any desired number of reciprocations can be imparted to the pen-slide during one reciprocation of the table X or rotation of the the table X', as the case may be.

A suitable train of gearing is that shown in Figs. 12 and 13, Sheet No. 8, of the accompanying drawings. On the axle 72 is a group of spur-wheels 90, so mounted as to be capable of being moved transversely thereon and locked thereto by means of a set-screw 91 or its equivalent. On the axle 30 is a spur-wheel 92, which gears with the smaller of a double spur-wheel 93, mounted on a stud-axle 94, carried by the frame of the machine. On this stud-axle is pivoted an arm 95, which carries a spur-wheel 96, gearing with the larger of the double spur-wheel 93 and adapted to be put in gear with one or other of the group of spur-wheels 90 on the axle 72.

When the mechanism for imparting a reciprocating movement to the pen-slide is used with the reciprocating table X, motion is imparted to the axle 30 by fixing the pinion 29 to it; but when the mechanism is used with the rotating table X' the shaft 30 receives its motion from the sleeve or hollow axle 104 of the frame 103, carrying the said table, by means of an axle 97, mounted in suitable bearings 98, carried by the frame of the machine, and carrying at its forward end a bevel-wheel 99, gearing with a second bevel-wheel 100 on the sleeve or hollow axle 104, and at its rear end a bevel-wheel 101, gearing with a similar wheel 102 on the axle 30, as shown in Fig. 5.

It will be understood that by the use of a reciprocating pen-slide and a revoluble table polysided and other geometrical figures of infinite variety can be ruled.

What we claim, and desire to secure by Letters Patent, is—

1. In a ruling-machine, the combination, with a movable table, and a pivoted pen-beam; of a pivoted striker, clutch mechanism connecting the striker with the pen-beam and permitting the pen-beam to be raised independent of the striker, a revoluble cam, and intermediate lever mechanism arranged between the said cam and striker, whereby the rise and fall of the striker and pen-beam is controlled by the said cam, substantially as set forth.

2. In a ruling-machine, the combination, with a flexible tube for feeding the ink to the pens, and a bar bearing against one side of the said tube; of a shaft, a nipping-bar secured to the said shaft and bearing against the other side of the said tube, a pivoted rocking lever and means for operating it, and an arm 49 operatively connected with the said shaft and arranged in the path of the said lever, said arm being connected with the said shaft so that it may be placed out of engagement with the said lever when a supply of ink is not required, substantially as set forth.

3. In a ruling-machine, the combination, with a table, and means for moving it back and forth in a horizontal plane; of a pen-beam supported over the table, a pen-slide carried by the pen-beam, and means for reciprocating the pen-slide in the pen-beam parallel with the surface of the table and crosswise of the direction of its motion, substantially as set forth.

4. In a ruling-machine, the combination, with a table, and driving mechanism for moving it back and forth in a horizontal plane; of a pivoted pen-beam, a pen-slide slidable in the pen-beam, and driving mechanism which reciprocates the said pen-slide and permits the pen-beam to move vertically, the said driving mechanisms being operatively connected together, substantially as set forth.

5. In a ruling-machine, the combination, with a revoluble table, of driving mechanism which causes the table to travel slightly more than one complete revolution, brake mechanism stopping the table at the completion of its movement in one direction, and means for driving the table back to the position from which it started, substantially as set forth.

6. In a ruling-machine, the combination, with a revoluble table, and grippers for holding the paper on the table; of a tubular driving-shaft for driving the said table, a stationary and tubular stud-axle having the said shaft journaled on it, a transverse bar operating the said grippers, and a spindle movable longitudinally in the said stud-axle and operating to raise the said bar, substantially as set forth.

7. In a ruling-machine, the combination, with a table, and driving mechanism for moving it back and forth in a horizontal plane; of a pen-beam supported over the said table, a pen-slide slidable in the said pen-beam crosswise of the direction of motion of the table, and driving mechanism for reciprocating the pen-slide provided with change-wheels for varying the number of reciprocations of the pen-slide with respect to those of the table, the said driving mechanisms being operatively connected together, substantially as set forth.

8. In a ruling-machine, the combination, with a table to receive the sheets of paper to be ruled, of a pivoted pen-beam, a striker pivoted concentric with the pen-beam, clutch mechanism connecting the striker with the pen-beam when the striker is moving in one direction, one or more cams for operating the said striker carried by a cam-disk on the main axle of the machine, and means for imparting a variable reciprocating movement to the pen-slide, as and for the purpose set forth.

9. In a ruling-machine, the combination, with a revoluble table formed of two parts superimposed one above the other, the lower part having radial slots and the upper part having pins projecting through the said slots, of a foundation-plate provided with a stud-axle for supporting the lower part of the table, an adjustable guide-ring supported by the foundation-plate and provided with a groove with which the said pins engage, and an intermediate axle receiving motion from the main axle of the machine and imparting motion to the upper part of the revoluble table, substantially as set forth.

10. In a ruling-machine, the combination, with a pivoted pen-beam, of a striker pivoted concentric with the pen-beam, clutch mechanism connecting the striker with the pen-beam when the striker is moving in one direction, one or more cams for operating the said striker, a revoluble table formed of two parts superimposed one above the other, the lower part having radial slots and the upper part having pins projecting through the said slots, a foundation-plate provided with a stud-axle for supporting the lower part of the table, an adjustable guide-ring supported by the foundation-plate and provided with a groove with which the said pins engage, and an intermediate axle receiving motion from the main axle of the machine and imparting motion to the upper part of the rotating table, substantially as and for the purpose set forth.

11. In a ruling-machine, the combination, with a pivoted pen-beam, of a striker pivoted concentric with the pen-beam, clutch mechanism connecting the striker with the pen-beam when the striker is moving in one direction, one or more cams on the main axle for operating the said striker, a revoluble table formed of two parts superimposed one above the other, the lower part having radial slots and the upper part having pins projecting through the said slots, a foundation-plate provided with a stud-axle for supporting the lower part of the table, an adjustable guide-ring supported by the foundation-plate and provided with a groove with which the said pins engage, an intermediate axle receiving motion from the main axle of the machine and imparting motion to the upper part of the rotating table, and means for imparting a reciprocating movement to the pen-slide, substantially as and for the purpose set forth.

12. In a ruling-machine, the combination, with a frame, and a pen-beam pivoted to the frame and provided with a striker for raising and lowering it; of a table, a driving-shaft, a revoluble cam driven by the said shaft, a lever pivoted to the frame and provided with a roller which engages with the said cam, a connecting-rod pivoted to the said striker and lever, and intermediate driving mechanism arranged between the said table and shaft and operating to move the table back and forth once to each revolution of the said cam, substantially as set forth.

13. In a ruling-machine, the combination, with a frame, and a longitudinally-movable table supported by the frame; of an endless flexible band, means for supporting and driving the said band, a bracket secured to the table and provided with a slot through which the said band passes, a gripping-piece slidable in the said bracket, and an eccentric carried by the said bracket and operating to press the gripping-piece on the said band thereby clamping it to the bracket, substantially as set forth.

14. In a ruling-machine, the combination, with a frame, a stationary bar carried by the frame, an ink-reservoir, and a flexible feed-tube connected to the ink-reservoir; of a nipping-bar pivoted to the said frame, means for causing the nipping-bar to nip the said tube against the aforesaid bar, a trip-lever pivoted to the frame and operating to retract the nipping-bar, a revoluble driving-cam, and rod-and-lever mechanism operatively connecting the said cam with the said trip-lever, substantially as set forth.

15. In a ruling-machine, the combination, with a frame, a stationary bar carried by the frame, an ink-reservoir, a flexible feed-tube connected to the reservoir, and a nipping-bar pivoted to the said frame and operating automatically to nip the feed-tube against the aforesaid bar; of a table, a driving-shaft, a revoluble cam driven by the said shaft, a trip-lever pivoted to the frame and operating to retract the nipping-bar, rod-and-lever mechanism operatively connecting the said cam with the trip-lever, and intermediate driving mechanism arranged between the said table and shaft and operating to move the table in one direction while the said feed-tube is released and in the reverse direction while the feed-tube is nipped, substantially as set forth.

16. In a ruling-machine, the combination, with a frame, a table carried by the frame, and a paper-gripper pivoted to the table and provided with a lever for operating it; of two levers pivoted to the frame, a bar pivoted to the free ends of the said levers and operating the gripper-lever when raised, a revoluble cam, and an arm connected to one of the said two levers and operated by the said cam, substantially as set forth.

17. In a ruling-machine, the combination, with a frame, a pen-beam pivoted to the frame, and a pen-slide carried by the said beam and slidable crosswise of the frame; of a table carried by the frame, a driving-shaft, intermediate driving mechanism arranged between the said shaft and table and operating to move the table back and forth, and intermediate driving mechanism arranged between the said shaft and the pen-slide and operating to reciprocate the pen-slide crosswise of the direction of motion of the table while the said table is in motion, substantially as set forth.

18. In a ruling-machine, the combination, with a frame, a pen-beam pivoted to the frame, a pen-slide carried by the said beam and slidable crosswise of the frame, and a projecting pin 63 operatively connected to the said pen-slide; of guides carried by the frame, a bar slidable in the said guides crosswise of the frame, a plate carried by the said bar and having a vertical slot which engages with the said pin, and a crank-shaft provided with an adjustable crank-pin which is operatively connected with the said bar, substantially as set forth.

ELLIS GRABER.
LEWIS HEPWORTH.

Witnesses:
ROBERT E. PHILLIPS,
WILLIAM H. JAMES.